US012789554B2

(12) United States Patent
Shahin

(10) Patent No.: US 12,789,554 B2
(45) Date of Patent: Nov. 10, 2026

(54) FASTENER FOR FIXING A BRAKE DISK TO A WHEEL HUB AND AXLE ASSEMBLY FOR A VEHICLE

(71) Applicant: HL MANDO CORPORATION, Pyeongtaek (KR)

(72) Inventor: Hatem Shahin, Pfaffenhofen (DE)

(73) Assignee: HL MANDO CORPORATION, Pyeongtaek (KR)

(*) Notice: Subject to any disclaimer, the term of this patent is extended or adjusted under 35 U.S.C. 154(b) by 308 days.

(21) Appl. No.: 18/583,952

(22) Filed: Feb. 22, 2024

(65) Prior Publication Data

US 2025/0135803 A1 May 1, 2025

(51) Int. Cl.

| | |
|---|---|
| ***B60B 27/00*** | (2006.01) |
| ***B60T 1/06*** | (2006.01) |
| ***F16B 5/02*** | (2006.01) |
| ***F16D 65/00*** | (2006.01) |
| ***F16D 65/12*** | (2006.01) |
| *F16B 41/00* | (2006.01) |
| *F16B 43/00* | (2006.01) |
| *F16D 65/02* | (2006.01) |

(52) U.S. Cl.

CPC ...... *B60B 27/0063* (2013.01); *B60B 27/0052* (2013.01); *B60T 1/065* (2013.01); *F16B 5/0241* (2013.01); *F16D 65/0006* (2013.01); *F16D 65/123* (2013.01); *F16B 41/002* (2013.01); *F16B 43/001* (2013.01); *F16D 2065/1384* (2013.01); *F16D 2065/1392* (2013.01)

(58) Field of Classification Search

CPC ............... F16D 65/0006; F16D 65/123; F16D 2065/1384; F16D 2065/1392; F16D 65/0012; B60B 27/0052; B60B 27/0063; F16B 5/0241; F16B 1/002

See application file for complete search history.

(56) References Cited

U.S. PATENT DOCUMENTS

2020/0191213 A1* 6/2020 Matti .................... F16D 65/123

FOREIGN PATENT DOCUMENTS

| | | | | |
|---|---|---|---|---|
| DE | 1775685 A | 9/1971 | | |
| DE | 284954 A5 | 11/1990 | | |
| DE | 10257056 A1 | 6/2004 | | |
| DE | 10257719 A1 * | 7/2004 | ........... | F16D 65/123 |
| JP | S53-3391 U | 1/1978 | | |
| JP | 3196133 B2 | 8/2001 | | |
| JP | 2003014008 A | 1/2003 | | |
| JP | 2003-148527 A | 5/2003 | | |
| JP | 2009150419 A * | 7/2009 | | |

OTHER PUBLICATIONS

Plastics-Determination of dynamic mechanical properties, ISO 6721-3:2021.

Office Action of the corresponding German family application.

* cited by examiner

*Primary Examiner* — Tinh T Dang

(74) *Attorney, Agent, or Firm* — Harvest IP Law, LLP

(57) ABSTRACT

A fastener for fixing a brake disk to a wheel hub includes a shaft, a head formed on an end of the shaft, or a counterpart configured for being coupled to the shaft, and at least one damping member integrated into the shaft and/or disposed on a surface of the head or the counterpart.

13 Claims, 10 Drawing Sheets

FASTENER FOR FIXING A BRAKE DISK TO A WHEEL HUB AND AXLE ASSEMBLY FOR A VEHICLE

CROSS-REFERENCE TO RELATED APPLICATION

This application claims the benefit of German Patent Application No. 102023129341.9, filed on Oct. 25, 2023 in the German Patent Office (DPMA), the disclosures of which are incorporated herein by reference in its entirety.

BACKGROUND

1. Technical Field

The present invention relates to a fastener for fixing a brake disk to a wheel hub and an axle assembly for a vehicle.

2. Description of the Related Art

A friction brake for a vehicle, typically, includes a rotor coupled to a wheel of the vehicle and a friction part which is coupled to a body or an axle of the vehicle and configured for being moved into contact with the rotor to generate a frictional force to apply a brake moment to the rotor. For example, in a disk brake, a disk forms the rotor and is coupled to a wheel hub of the vehicle. A disk brake further comprises a brake caliper coupled to a body or an axle of the vehicle, wherein the brake caliper includes a friction pad as the friction part. For braking the wheel, the friction pad is pressed against the disk by an external brake force, which may, for example, be generated aid of hydraulic pressure, to generate a frictional force between the friction pad and the disk.

During a brake operation, in which the friction part is in contact with the rotor, relative motion between the rotor and the friction part occurs which may cause vibrations, mainly of the rotor and the friction pad. Consequently, squeal noise may occur. However, vibration is not limited to the brake as such but also occur in the axle of the vehicle. Since the rotor is connected to the axle a path of force flow exists between the rotor and the axle. Therefore, vibrations in the axle may cause vibration in the brake disk and contribute to vibrational noises generated by the brake disk. Generally, also when a brake as such is thoroughly designed to reduce squeal noises, there may be situation in which squeal noise occurs because the axle and the brake are coupled.

SUMMARY

A friction brake for a vehicle, typically, includes a rotor coupled to a wheel of the vehicle and a friction part which is coupled to a body or an axle of the vehicle and configured for being moved into contact with the rotor to generate a frictional force to apply a brake moment to the rotor. For example, in a disk brake, a disk forms the rotor and is coupled to a wheel hub of the vehicle. A disk brake further comprises a brake caliper coupled to a body or an axle of the vehicle, wherein the brake caliper includes a friction pad as the friction part. For braking the wheel, the friction pad is pressed against the disk by an external brake force, which may, for example, be generated aid of hydraulic pressure, to generate a frictional force between the friction pad and the disk.

During a brake operation, in which the friction part is in contact with the rotor, relative motion between the rotor and the friction part occurs which may cause vibrations, mainly of the rotor and the friction pad. Consequently, squeal noise may occur. However, vibration is not limited to the brake as such but also occur in the axle of the vehicle. Since the rotor is connected to the axle a path of force flow exists between the rotor and the axle. Therefore, vibrations in the axle may cause vibration in the brake disk and contribute to vibrational noises generated by the brake disk. Generally, also when a brake as such is thoroughly designed to reduce squeal noises, there may be situation in which squeal noise occurs because the axle and the brake are coupled.

It is one of the objects of the present invention to provide improved solutions for reducing acoustic noise generated by brake disk of a brake of a vehicle.

To this end, the present invention provides a fastener in accordance with claim 1, and an axle assembly in accordance with claim 13.

According to a first aspect of the invention, a fastener for fixing a brake disk to a wheel hub includes a shaft, a head formed on an end of the shaft or a counterpart configured for being coupled to the shaft, and at least one damping member integrated into the shaft and/or disposed on a surface of the head or the counterpart.

According to a second aspect of the invention, an axle assembly for a vehicle includes a wheel hub comprising plural attachment openings, a brake disk comprising plural through holes positioned aligned with the attachment openings of the wheel hub, and plural fasteners according to the first aspect of the invention fastening the brake disk to the wheel hub, wherein each fastener extends with its shaft through one of the attachment openings of the brake disk and into one of the attachment openings of the wheel hub, and with its head or counterpart abuts against the brake disk.

It is one of the ideas of the present invention to reduce mutual excitation of vibrations of a brake disk and components of an axle of a vehicle by using fasteners for connecting the brake disk to the axle that comprise a damping member. The damping member is made of an elastically deformable material that is configured to dampen or absorb vibrations, e.g., in a frequency range between 1 kHz and 12 KHz. The damping member is integrated into a shaft of the fastener and, additionally or alternatively, disposed on a surface of a head or a counterpart of the fastener.

The shaft extends longitudinally between a first end and an opposite second end and defines or has a central axis. For example, the shaft may be cylindrical. The damping member, when integrated in the shaft, is integrated into the cross-section of the shaft.

The head, if provided, is formed at the first end of the shaft and protrudes from the circumference of the shaft. For example, the head may have a greater diameter than the shaft. Optionally, the head is integrally formed with the shaft.

The counterpart, if provided, is configured to be coupled to the shaft. This may include that the counterpart has an engagement structure configured to engage an engagement structure formed on an outer circumferential surface of the shaft so that a form fit is achieved between the shaft and the counterpart. Alternatively, the counterpart may also be friction fit to the outer circumferential surface of the shaft, e.g., by crimping, shrinking or similar. When coupled to the shaft, the counterpart protrudes from the circumference of the shaft.

When provided on the head or the counterpart, the damping member is provided on a surface thereof, e.g., as a surface layer, a coating or similar.

In an axle assembly, the brake disk is fixed to a wheel hub by multiple of fasteners as described above. The brake disk, with a first side, may contact a contact surface of the wheel hub. The shaft each fastener extends through a through hole provided in the disk and protrudes into an attachment hole of the wheel hub where the shaft is preferably fixed, e.g., by a form or friction fit or a material joining connection. The head or counterpart abuts against a second side of the brake disk so that the disk is clamped between the head or counterpart and the contact surface of the wheel hub.

The damping elements of the fasteners effectively absorb vibrations. Since the force flow between the brake disk and the wheel hub extends through the fasteners, the damping elements of the fasteners help in reducing transmission of vibrations from the axle to the disk and vice versa. The damping elements of the fasteners help in decoupling the vibrations caused by self-excitation on the brake side, i.e., in the brake disk, and vibrations coming from the axle side. Thus, generation of acoustic noise can be efficiently reduced.

Further embodiments of the present invention are subject to the dependent claims and the following description, referring to the drawings.

According to some embodiments, the shaft may comprise a central recess extending along a central axis of the shaft, wherein the damping member is disposed in the central recess. The damping member has a cross-section corresponding to the cross-section of the central recess and, thus, completely fills the central recess. The central recess may, for example, extend colinear with the central axis.

According to some embodiments, an inner diameter of the central recess may lie in a range of 10% to 70% of an outer diameter of the shaft.

According to some embodiments, the shaft may comprise an annular recess surrounding and extending along a central axis of the shaft, wherein the damping member is disposed in the annular recess. The damping member also has an annular cross-section corresponding to the annular recess and, thus, completely fills the annular recess.

According to some embodiments, the shaft may comprise plural recesses extending along a central axis of the shaft, wherein one damping member is disposed in each of the plural recesses. For example, multiple recesses may be arranged around the central axis.

It should be noted that the plural recesses may also be combined with an annular recess or the central recess. Likewise, it may also be provided that the annular recess is combined with one central recess.

Generally, integrating the damping member into the shaft helps absorbing vibrations in a very efficient way.

According to some embodiments, the head or the counterpart may comprise a contact surface at least partially surrounding the shaft and being oriented along a central axis of the shaft, wherein the damping member is disposed on the contact surface. The contact surface faces the brake disk when the fastener attaches the disk to the wheel hub. That is, the damping member may directly contact the disk when being disposed on the contact surface. Thereby, vibrations can efficiently be absorbed by the damping member.

According to some embodiments, the damping member has a thickness in a range between 0.5 mm and 5 mm.

According to some embodiments, the damping member may be made of a material having a dissipation factor greater or equal than 0.5%, preferably greater or equal than 1%, particularly preferably greater or equal than 3%. The dissipation factor may, for example, be determined in accordance with DIN EN ISO 6721-3 or as disclosed in DE 102 57 056 A1. While steel has a relatively low dissipation factor of 0.1% to 0.3%, Aluminum already has a dissipation factor in a range between 0.5% and 1.2%. Cast Iron has a dissipation factor in a range between 1% and 3%, duroplast material has a dissipation factor in a range between 4% and 12%, hard rubber has a dissipation factor between 5% and 15%, and soft rubber has a dissipation factor in a range between 15% and 35%.

According to some embodiments, the damping member may be made of an elastomer material, in particular, rubber, a thermoplastic or a duroplast material, or cast iron.

According to some embodiments, the shaft and the head or the counterpart are made of a metal material.

According to some embodiments, the shaft comprises an external thread. The external thread may form an engagement structure for coupling the shaft with a nut or for engaging the shaft with an internal thread provided in the attachment opening of the wheel hub.

According to some embodiments, the counterpart may a nut or a sleeve. The nut or the sleeve may be provided with an internal thread for being coupled to the shaft, for example.

According to some embodiments, the axle assembly may comprise a knuckle and a brake caliper mounted to the knuckle. The brake caliper may comprise a friction pad which is movable into contact with the brake disk to apply a friction braking force to the brake disk. For example, the wheel hub may be rotatably mounted to the knuckle, while the brake caliper is stationary fixed to the knuckle. The friction pad may be movable along an axial direction parallel to the rotational axis of the wheel hub. For moving the friction pad, a piston or another actuator may be provided as part of the brake caliper.

The features and advantages described herein with respect to one aspect of the invention are also disclosed for the other aspects and vice versa.

With respect to directions and axes, in particular, with respect to directions and axes concerning the extension or expanse of physical structures, within the scope of the present invention, an extent of an axis, a direction, or a structure "along" another axis, direction, or structure includes that said axes, directions, or structures, in particular tangents which result at a particular site of the respective structure, enclose an angle which is smaller than 45 degrees, preferably smaller than 30 degrees and in particular preferable extend parallel to each other.

With respect to directions and axes, in particular with respect to directions and axes concerning the extension or expanse of physical structures, within the scope of the present invention, an extent of an axis, a direction, or a structure "crossways", "across", "cross", or "transversal" to another axis, direction, or structure includes in particular that said axes, directions, or structures, in particular tangents which result at a particular site of the respective structure, enclose an angle which is greater or equal than 45 degrees, preferably greater or equal than 60 degrees, and in particular preferable extend perpendicular to each other.

BRIEF DESCRIPTION OF THE DRAWINGS

For a more complete understanding of the present invention and advantages thereof, reference is now made to the following description taken in conjunction with the accompanying drawings. The invention is explained in more detail below using exemplary embodiments, which are specified in the schematic figures of the drawings, in which.

In the figures like reference signs denote like elements unless stated otherwise.

DETAILED DESCRIPTION OF EMBODIMENTS

Figure 1:
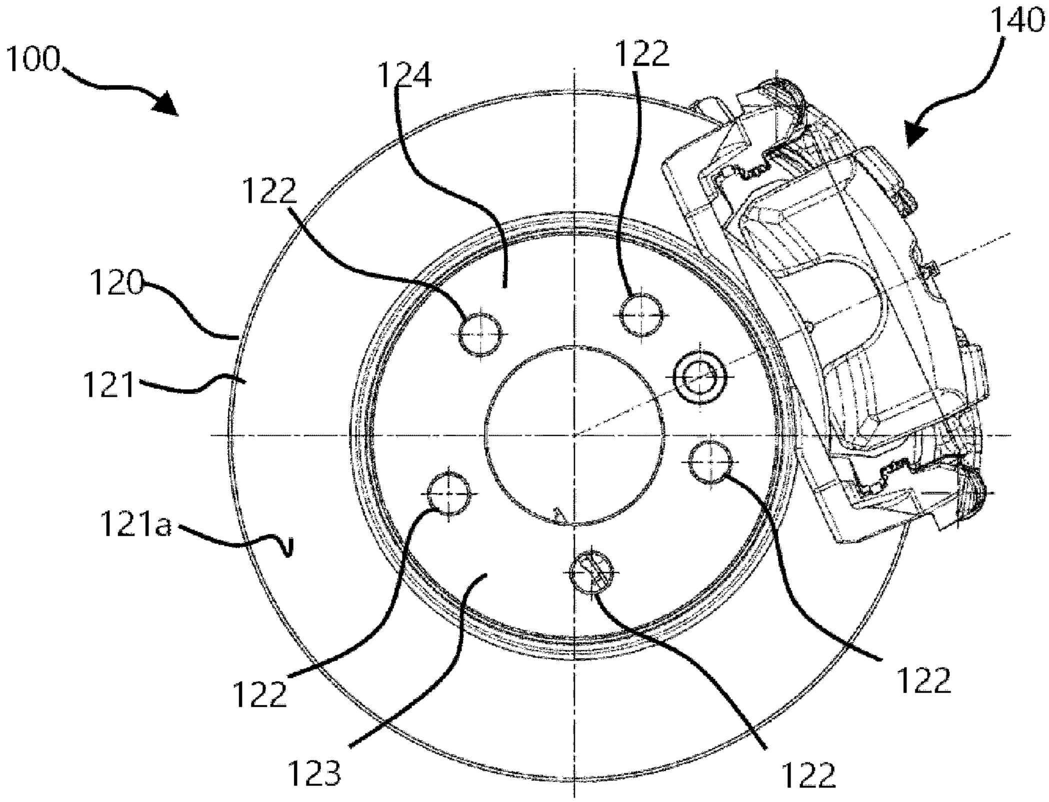
FIG. 1 schematically illustrates a plan view of an axle assembly according to an embodiment of the invention.
Figure 2:
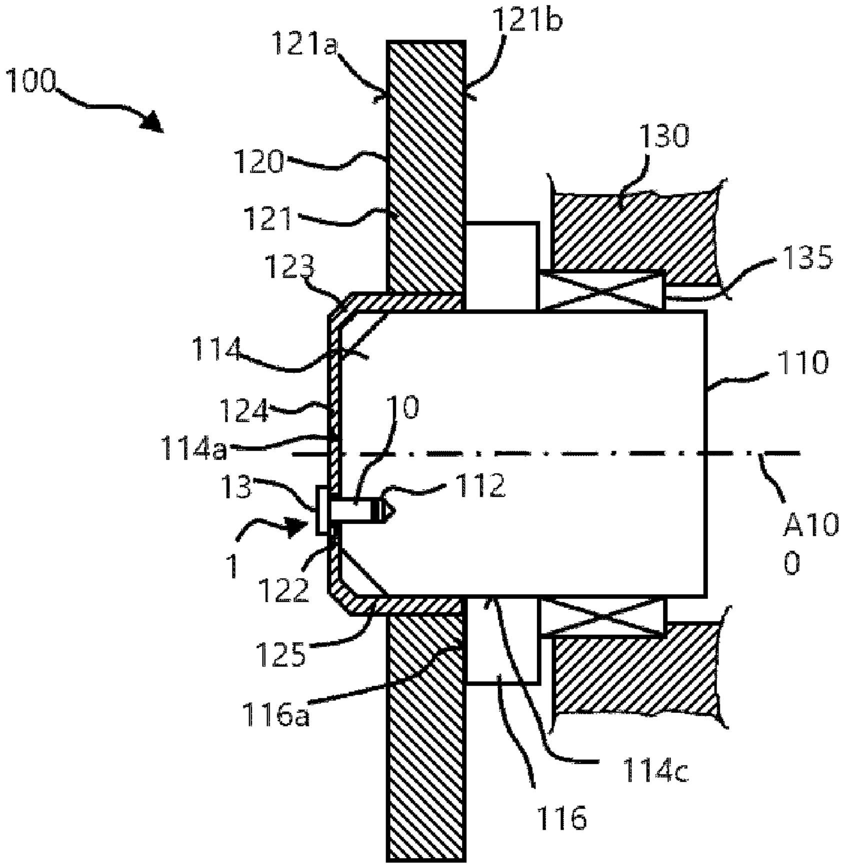
FIG. 2 schematically illustrates cross-sectional partial view of an axle assembly according to an embodiment of the invention.
Figure 3:
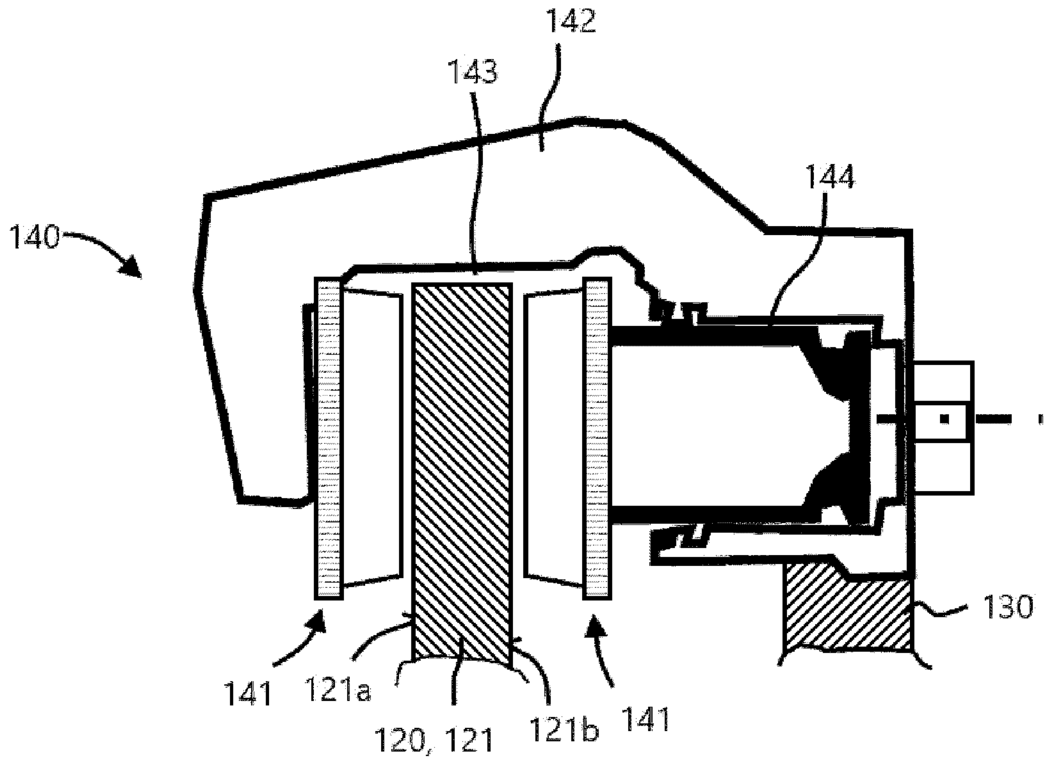
FIG. 3 schematically illustrates a further cross-sectional partial view of an axle assembly according to an embodiment of the invention.

FIG. 1 schematically shows a plan view of an axle assembly 100 for a vehicle. FIG. 2 shows a partial cross-sectional view of the axle assembly 100 in the region of a wheel hub 110, and FIG. 3 shows a further partial cross-sectional view of the axle assembly 100 in the region of a brake caliper 140. The axle assembly 100 may be employed, for example, in an automobile, a bus, a lorry, a motorcycle or similar.

As schematically shown in FIGS. 1 to 3, the axle assembly 100 comprises a wheel hub 110, a brake disk 120, a knuckle 130, and a brake caliper 140. The brake disk 120 and the brake caliper 140, together, form a friction brake, in particular, a disk brake. The wheel hub 110 and the knuckle 130 form an axle.

The wheel hub 110 is only schematically shown in FIG. 2 and may include a central body 114, which may, for example, by a cylindrical or polygonal shaft, and a collar 116 protruding from a circumferential surface 114*c* of the rim 116. The collar 116 may include a contact surface 116*a*.

The wheel hub 110 may be rotatably mounted to the knuckle 130, e.g., by means of a bearing 135, as schematically shown in FIG. 2. Generally, the wheel hub 110 may be mounted to be rotatable about a rotational axis A100. The rotational axis A100 may be defined by the bearing 135. The contact surface 116*a* of the rim 116*a* may be oriented along the rotational axis A100.

The wheel hub 110 comprises a plurality of attachment holes 112. In FIG. 2, for the sake of clarity, only one single attachment hole 112 is shown. The attachment holes 112, for example, may be formed in the central body 114 of the wheel hub 110, as exemplarily shown in FIG. 2. However, the invention is not limited to this configuration.

The brake disk 120, generally, may be a disk shaped part and comprises oppositely oriented friction surfaces 121*a*, 121*b*. As exemplarily and only schematically shown in FIGS. 1 and 2, the disk 120 may comprise a disk body 121 and a disk cup 123. The disk body 121 may comprise the friction surfaces 121*a*, 121*b* and being formed as ring. The disk cup 123 may be arranged in a central opening of the ring shaped disk body 121 and being connected to the disk body 121, as schematically shown in FIG. 2. For example, the disk body 121 and the disk cup 123 may be material joined, e.g., by welding or similar. As exemplarily shown in FIG. 2, the cup 123 may comprise a plate shaped base member 124, and a centering wall 125 protruding from the base member 125 and defining a closed frame or circumferential wall. The centering wall 125 and the base member 124, together, define a receiving cavity.

The brake disk 120 further comprises a plurality of through holes 122. As exemplarily shown in FIGS. 1 and 2, the through holes 122 may be formed in the disk cup 123, in particular, in the base member 124 of the disk cup 123. However, the invention is not limited to this configuration.

As schematically shown in FIG. 2, the disk 120 is attached to the wheel hub 110 by means of fasteners 1 which will be described in more detail below. The disk 120 is positioned on the wheel hub 110 such that the through holes 122 of the disk 120 are aligned with the attachment openings 112 of the wheel hub 110. As exemplarily and schematically shown in FIG. 2, the central body 114 of the wheel hub 110 may protrude into the receiving opening of the disk cup 123, wherein an end face 114*a* of the central body 114 may contact the base member 124 of the cup 123. Additionally or alternatively, the circumferential surface 114*c* of the central body 114 of the wheel hub 110 may be in contact with an inner circumferential surface of the circumferential wall 125 of the cup 123. Further optionally, the brake disk 120 may abut against the contact surface 116*a* of the optional collar 116.

The brake caliper 140 is shown with some details in FIG. 3 in a simplified manner. As shown in FIG. 3, the brake caliper 140 comprises a carrier 142, a pair of friction pads 141, and at least one actuator 144. As further shown in FIG. 3, the carrier 142 defines a passage 143 through which the disk 120, in particular, the disk body 121 extends. The friction pads 141 are positioned on opposite sides of the passage 143 and are coupled to the carrier 142, for example, via respective clips (not shown). Generally, at least one of the friction pads 141 is coupled to the carrier 142 such that it is movable by the actuator 144 along an axial direction to come into contact with the friction surface 120*a*, 120*b* of the disk 120. The axial direction extends parallel to the rotational axis A100 of the wheel hub 110. The actuator 144, as exemplarily shown in FIG. 3, may be a hydraulic piston. For example, the actuator may be coupled to a hydraulic line which is connected to a main brake cylinder (not shown). The main brake cylinder may be actuated by a pedal or a lever, optionally, in concert with a brake force booster.

In the example of FIG. 3, the carrier 142 is mounted to the knuckle 130 so as to be movable along the axial direction. Thereby, if the actuator 144 moves the one friction pad 142 into contact with the friction surface 121*b* of the disk 120, an axial displacement of the carrier 142 takes place which moves the other friction pad 141 into contact with the opposite friction surface 121*a* of the disk 120. Consequently, a frictional force between the friction pads 141 and the disk 120 is generated which brakes the disk 120.

FIGS. 4 to 10 show in detail examples of fasteners 1 for the brake disk 120 to the wheel hub 110. As visible in FIGS. 4 to 10, a fastener 1 comprises a shaft 10, a head 13 or, alternatively, a counterpart 14 (FIG. 10), and at least one damping member 16.

The shaft 10, generally, extends between a first end 11 and a second end 12 and defines a central axis A10. For example, the shaft 10 may be a generally cylindrical part. As further schematically shown in FIGS. 4 to 10, the shaft 10, optionally, may comprise an external thread 18. The shaft 10 may have an outer diameter d10 that may be adapted to the braking moments applied to the disk 120 and the number of fasteners 1 used to fix the disk 120 to the hub 110. For example, the outer diameter d10 may lie in a range between 6 mm and 20 mm. The shaft 10 may be made of a metal material, e.g., steel.

FIGS. 4 to 9, exemplarily, show fasteners 1 having a head 13. The head 13 is formed on the first end 11 of the shaft 10. The head 13, generally, protrudes from the outer circumference of the shaft 10. For example, a diameter d13 may be greater than the outer diameter d10 of the shaft 10. The head 13 comprises a contact surface 13*a* which is oriented along the central axis A10 of the shaft 10. The contact surface 13*a*, thus, faces towards the second end 12 of the shaft 10. The head 13, for example, may be integrally formed with the shaft 10. Optionally, the head 13 may be made of a metal material, e.g., steel.

Figure 10:
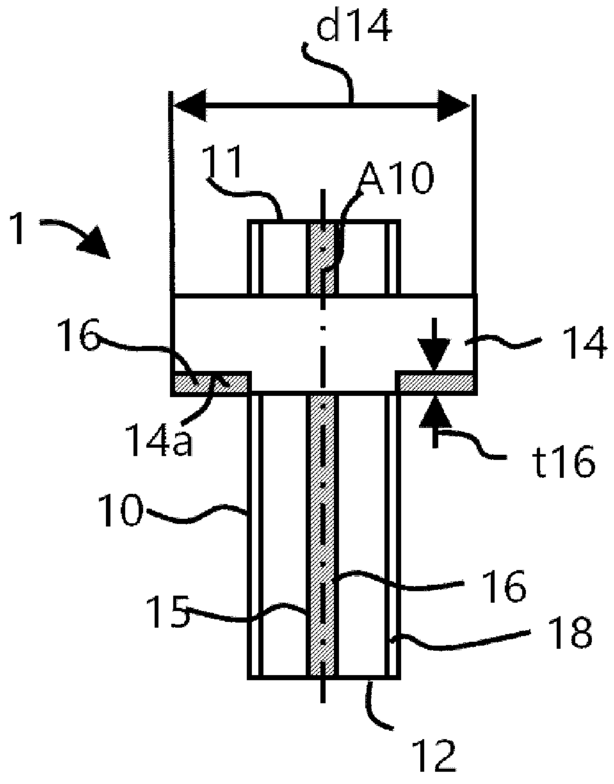
FIG. 10 schematically illustrates a cross-sectional view of a fastener according to a further embodiment of the invention.

FIG. 10 exemplarily shows a fastener 1 comprising a counterpart 14 instead of a head 13. The counterpart 14, for example, may be nut or a sleeve. Generally, the counterpart 14 is configured for being coupled to the shaft 10. For example, the counterpart 14 may be provided with an inner thread (not shown) that is configured to be screwed to the external thread 18 of the shaft 10. However, also other types of connection between the counterpart 14 and the shaft 10 are possible. As visible in FIG. 10, when being coupled to the shaft 10, the counterpart 14 also protrudes from the circumference of the shaft 10. For example, the counterpart 14 may have an outer diameter d14 greater than the outer diameter d10 of the shaft 10. The counterpart 14, similar as the head 13, may comprise a contact surface 14*a*. As shown in FIG. 10, the contact surface 14*a* is oriented along the central axis A10 and, thus, may face towards the second end 12 of the shaft 10, when the counterpart 14 is coupled to the shaft 10. The counterpart 14 may be made of a metal material such as, e.g., steel.

The at least one damping member 16, generally, is configured to absorb or dampen vibrations. For example, the damping member 16 may be made of a material having a dissipation factor greater or equal than 0.5%, optionally greater or equal than 1%, further optionally greater or equal than 3%. For example, the damping member 16 may be made of elastomer material, a thermoplastic or a duroplast material, or cast iron.

As schematically shown in FIGS. 5 to 7, 9 and 10, one or more damping members 16 may be integrated into the shaft 10 of the fastener 1. In general, the damping member 16, in this case, is integrated into or disposed within the cross-section of the shaft 10 and, preferably, is not disposed to the outer circumferential surface of the shaft 10.

Figure 4:
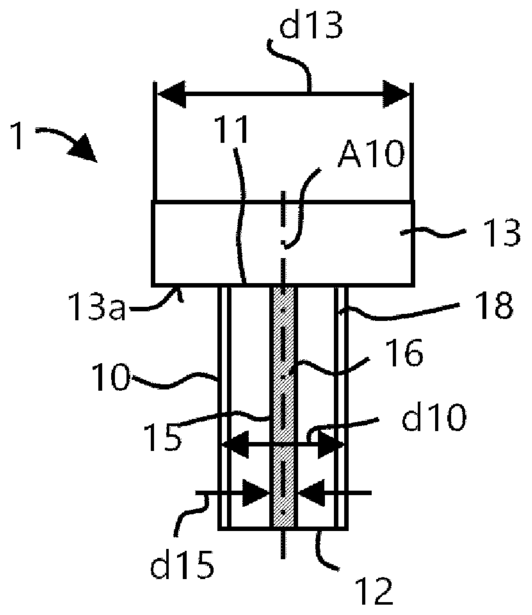
FIG. 4 schematically illustrates a cross-sectional view of a fastener according to an embodiment of the invention.
Figure 5:
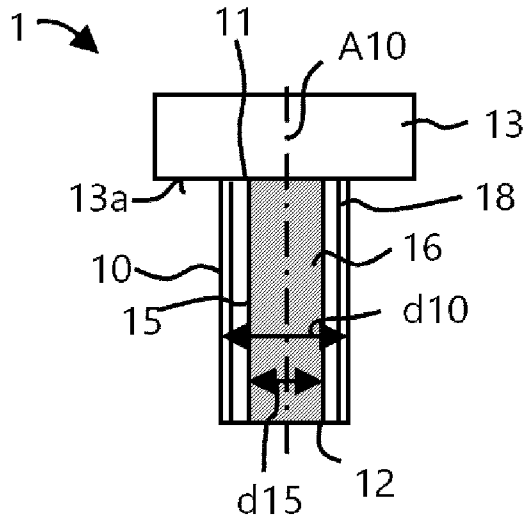
FIG. 5 schematically illustrates a cross-sectional view of a fastener according to a further embodiment of the invention.

For example, as schematically shown in FIGS. 4 and 5, the shaft 10 may comprise a central recess 15 extending along the central axis A10 of the shaft 10, and the damping member 16 may be disposed in the central recess 15. As visible in FIGS. 4 and 5, the central recess 15 may be coaxial to the central axis A10. The central recess 15 may, for example, have circular or polygonal cross-section but the invention is not limited to these cross-sectional shapes. An inner diameter d15 of the central recess 15 may lie, for example, in a range of 10% to 70% of the outer diameter d10 of the shaft 10. FIG. 4 schematically shows a fastener 1 in which the central recess 15 has an inner diameter d15 which is about 10% of the outer diameter d10 of the shaft 10. FIG. 5 schematically shows a fastener 1 in which the central recess 15 has an inner diameter d15 which is about 70% of the outer diameter d10 of the shaft 10. The central recess 15 may extend over the complete length of the shaft 10 between the first and the second end 11, 12, as exemplarily shown in FIGS. 4 and 5. Alternatively, it is also possible that the central recess 15 only extends over a part of the length of the shaft 10 and ends distanced to the first end 11 of the shaft 10. Generally, it may be provided that the central recess 15 extends over at least 50% of the length of the shaft 10 measured between the first and second end 11, 12.

The damping member 16 may have a cross-section that corresponds to the cross-section of the central recess 15 and completely fills the central recess 15. The damping member 16 may, for example, be joined to the inner circumferential surface of the central recess 15. For example, the damping member 16 may be filled into the recess 15 in a liquid state and cured or solidified in the recess 15.

Figure 6A:
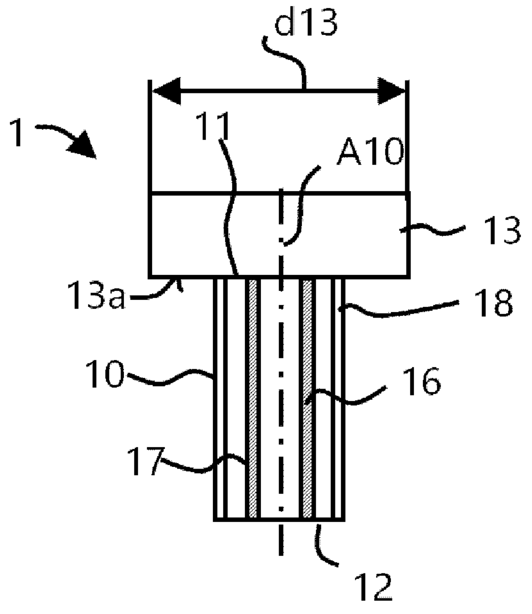
FIG. 6(A) schematically illustrates a cross-sectional view of a fastener according to a further embodiment of the invention.
Figure 6B:
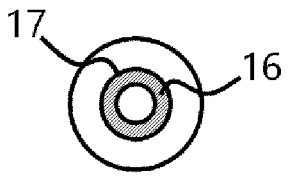
FIG. 6(B) schematically illustrates a plan view to the second end of the shaft of the fastener according to a further embodiment of the invention.

FIG. 6 exemplarily and schematically shows a fastener 1 in which the damping element 16 is integrated into the shaft 10 in an annular recess 17. In FIG. 6, view (A) shows a cross-sectional view of the fastener 1, and view (B) shows a plan view to the second end 12 of the shaft 10 of the fastener 1. As shown in FIG. 6, the shaft 10 may comprise an annular recess 17 surrounding and extending along the central axis A10 of the shaft 10. While FIG. 6 in view (B) shows that the annular recess 17 may have a circular shape, the invention is not limited to an annular recess 17 having circular shape but may also be in the form of a rectangle, a triangle, a hexagon or other closed annulus. The annular recess 17 may extend over the complete length of the shaft 10 between the first and the second end 11, 12, as exemplarily shown in FIG. 6. Alternatively, it is also possible that the annular recess 17 only extends over a part of the length of the shaft 10 and ends distanced to the first end 11 of the shaft 10. Generally, it may be provided that the annular recess 17 extends over at least 50% of the length of the shaft 10 measured between the first and second end 11, 12.

The damping member 16 may have a cross-section corresponding to the cross-section of the annular recess 17 and is disposed in the annular recess 17. The damping member 16, thus, completely fills the central recess 15. The damping member 16 may, for example, be joined to the inner and outer circumferential surfaces of the annular recess 17. For example, the damping member 16 may be filled into the recess 17 in a liquid state and cured or solidified in the recess 17.

Figure 7A:
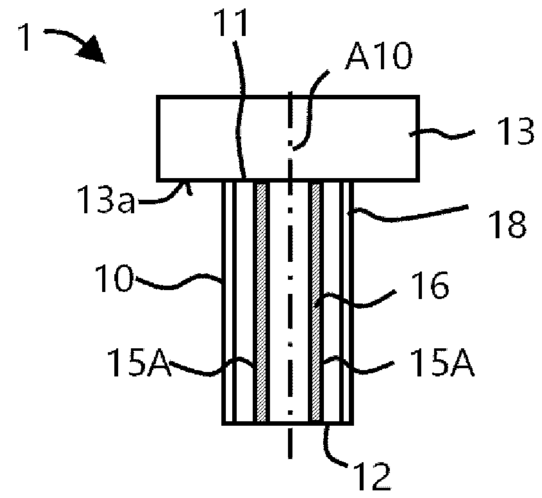
FIG. 7(A) schematically illustrates a cross-sectional view of a fastener according to a further embodiment of the invention.
Figure 7B:
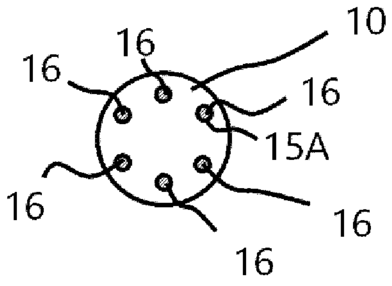
FIG. 7(B) schematically illustrates a plan view to the second end of the shaft of the fastener according to a further embodiment of the invention.

FIG. 7 exemplarily and schematically shows a fastener 1 in which multiple damping element 16 are integrated into the shaft 10 in a plurality of recesses 15A. In FIG. 7, view (A) shows a cross-sectional view of the fastener 1, and view (B) shows a plan view to the second end 12 of the shaft 10 of the fastener 1. As shown in FIG. 7, the shaft 10 may comprise multiple recesses 15A extending along the central axis A10 of the shaft 10. As exemplarily shown in view (B) of FIG. 7, the recesses 15A, for example, may have circular cross-section. However, the invention is not limited to circular cross-sections. As further exemplarily shown in FIG. 7, the recesses 15A may be arranged around the central axis A10 of the shaft 10. Further optionally, the recesses 15A may be equally distanced to each other along the circumference of the shaft 10. As visible in view (A) of FIG. 7, the recesses 15A all may have the same length. However, it may also be provided that at least some of the recesses 15A have different lengths. The recesses 15A, optionally, may extend over the complete length of the shaft 10 between the first and the second end 11, 12, as exemplarily shown in FIG. 7. Alternatively, it is also possible that the recesses 15A only extend over a part of the length of the shaft 10 and end distanced to the first end 11 of the shaft 10. Generally, it may be provided that the recesses 15A extend over at least 50% of the length of the shaft 10 measured between the first and second end 11, 12.

As shown in FIG. 7, one damping member 16 may be provided for each of the recesses 15A. The damping members 16 may have a cross-section that corresponds to the cross-section of the respective recess 15A and completely fill the respective recess 15. The damping members 16 may, for example, be joined to the inner circumferential surfaces of the recesses 15A. For example, the damping member 16 may be filled into the recesses 15A in a liquid state and cured or solidified in the recess 15.

It should be noted that multiple damping members 16 may be integrated into the shaft 10 by combining any one of the examples shown in FIGS. 4 to 7.

Figure 8:
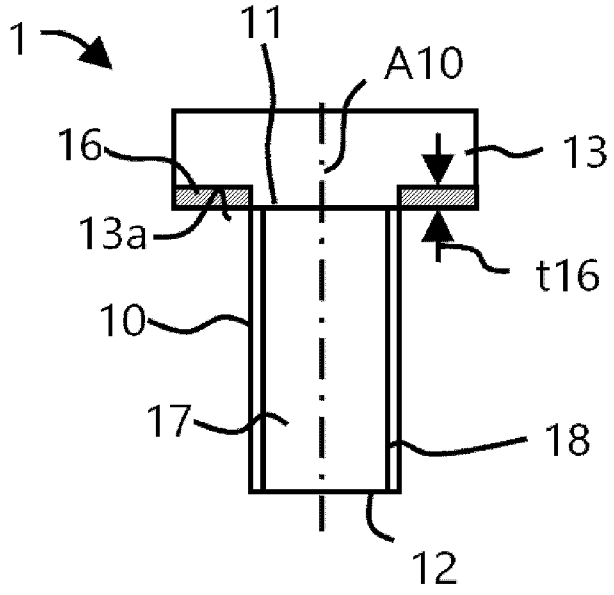
FIG. 8 schematically illustrates a cross-sectional view of a fastener according to a further embodiment of the invention.

As exemplarily shown in FIG. 8, it is also possible to dispose a damping member 16 on a surface of the head 13. For example, a damping member 16 may be disposed on the contact surface 13*a* of the head 13. As schematically shown in FIG. 8, it may be provided that the damping member 16 is formed on the contact surface 13*a* so as to completely surround the circumference of the shaft 10. Alternatively, it would also be possible to arrange multiple damping members 16 on the contact surface 13*a* spaced to each other along the circumference of the shaft 10. A thickness t16 of the damping member 16, in this case, may lie in a range between 0.5 mm and 5 mm, for example. The damping member 16 may be joined to the contact surface 13*a*, e.g., by an adhesive, by welding, or by another material joining method.

Figure 9:
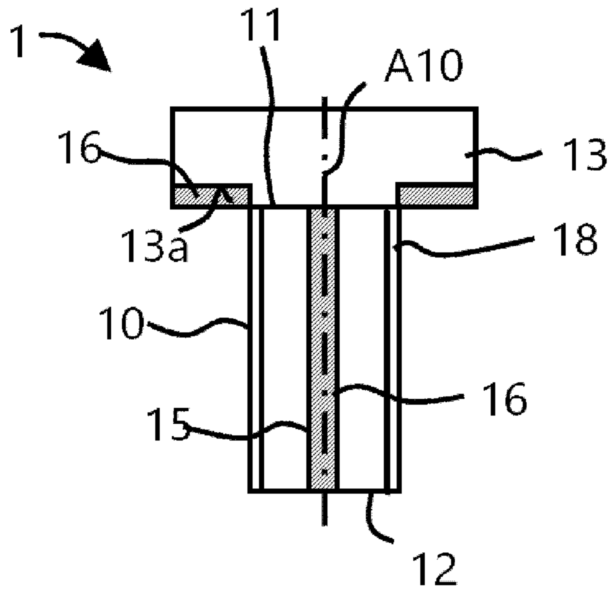
FIG. 9 schematically illustrates a cross-sectional view of a fastener according to a further embodiment of the invention.

FIG. 9, by way of example only, shows a fastener 1 in which a damping element 13 is disposed on the contact surface 13*a* of the head 13, and a further damping element 13 is disposed in a central recess 15 of the shaft 10. Of course, instead of a central recess 15, it would also be possible to provide any types of recesses 15, 15A, 17 as described above by reference to FIGS. 4 to 7 or any combinations thereof.

In the fastener 1 exemplarily shown in FIG. 10, the damping member 16 is disposed on the contact surface 14*a* of the counterpart 14. As schematically shown in FIG. 9, it may be provided that the damping member 16 is formed about entire circumference of the counterpart 14 so that, when the counterpart 14 is coupled to the shaft 10, the contact surface 14*a* completely surrounds the circumference of the shaft 10. Alternatively, it would also be possible to arrange multiple damping members 16 on the contact surface 14*a* spaced to each other along the circumference of the counterpart 14. A thickness t16 of the damping member 16, in this case, may lie in a range between 0.5 mm and 5 mm, for example. The damping member 16 may be joined to the contact surface 14*a*, e.g., by an adhesive, by welding, or by another material joining method.

Referring again to FIG. 2, to fix the brake disk 120 to the wheel hub 110, each fastener 1 with its shaft 1 extends through one of the attachment openings 122 of the brake disk 120 and into one of the attachment openings 112 of the wheel hub 110. For example, the shaft 10 may be fixed in the attachment opening 112, e.g., in that the external thread 18 is screwed to an internal thread (not shown) of the attachment opening 112. Further, each fastener 1 with its head 13 or counterpart 14 abuts against the brake disk 120, e.g., against the base member 124 of the disk cup 123. Thereby, the disk 120, i.e., the disk cup 123, is clamped between the head 13 or counterpart 14 and the hub 110, i.e., the end face 114*a* of the central body 114 of the hub 110.

Since the fasteners 1 include the damping member 16, vibrations occurring in the disk 120, e.g., due to relative motion between the friction pads 141 and the disk 120 during braking, or occurring in the axle are at least partially absorbed in the damping member 16 which is arranged in the force flow path between the hub 110 and the disk 120. Consequently, mutual excitation of the disk 120 and the hub 110 or, generally, the axle is inhibited Thereby, occurrence of acoustic noise can be reduced.

Although specific embodiments have been illustrated and described herein, it will be appreciated by those of at least ordinary skill in the art that a variety of alternate and/or equivalent implementations exist. It should be appreciated that the exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

What is claimed is:

1. A fastener for fixing a brake disk to a wheel hub, comprising:

a shaft;

a head formed on an end of the shaft or a counterpart configured for being coupled to the shaft; and at least one damping member integrated into the shaft and/or disposed on a surface of the head or the counterpart, wherein the shaft comprises a central recess extending along a central axis of the shaft, wherein the damping member is disposed in the central recess.

2. The fastener of claim 1, wherein an inner diameter of the central recess lies in a range of 10% to 70% of an outer diameter of the shaft.

3. The fastener of claim 1, wherein the shaft comprises an annular recess surrounding and extending along a central axis of the shaft, wherein the damping member is disposed in the annular recess.

4. The fastener of claim 1, wherein the shaft comprises plural recesses extending along a central axis of the shaft, wherein one damping member is disposed in each of the plural recesses.

5. The fastener of claim 1, wherein the head or the counterpart comprises a contact surface at least partially surrounding the shaft and being oriented along a central axis of the shaft, wherein the damping member is disposed on the contact surface.

6. The fastener of claim 5, wherein the damping member has a thickness in a range between 0.5 mm and 5 mm.

7. The fastener of claim 1, wherein the damping member is made of a material having a dissipation factor greater than 0.5%.

8. The fastener of claim 1, wherein the damping member is made of an elastomer material, a thermoplastic or a duroplast material, or cast iron.

9. The fastener of claim 1, wherein the shaft and the head or the counterpart are made of a metal material.

10. The fastener of claim 1, wherein the shaft comprises an external thread.

11. The fastener of claim 1, wherein the counterpart is a nut or a sleeve.

12. An axle assembly for a vehicle, comprising:

a wheel hub comprising plural attachment openings;

a brake disk comprising plural through holes positioned aligned with the attachment openings of the wheel hub; and plural fasteners according to claim 1 fastening the brake disk to the wheel hub, wherein each fastener extends with its shaft through one of the attachment openings of the brake disk and into one of the attachment openings of the wheel hub, and with its head or counterpart abuts against the brake disk.

13. The axle assembly of claim 12, further comprising:

a knuckle; and a brake caliper mounted to the knuckle, the brake caliper comprising a friction pad movable into contact with the brake disk to apply a friction braking force to the brake disk.

* * * * *